(No Model.)

P. CURRAN.
NUT LOCK.

No. 605,859.  Patented June 21, 1898.

Witnesses

Inventor
— Peter Curran —

Attorneys

UNITED STATES PATENT OFFICE.

PETER CURRAN, OF NANTICOKE, PENNSYLVANIA, ASSIGNOR OF ONE-HALF TO PAUL BARRALL, OF SAME PLACE.

NUT-LOCK.

SPECIFICATION forming part of Letters Patent No. 605,859, dated June 21, 1898.

Application filed January 27, 1898. Serial No. 668,138. (No model.)

*To all whom it may concern:*

Be it known that I, PETER CURRAN, a citizen of the United States, residing at Nanticoke, in the county of Luzerne and State of Pennsylvania, have invented certain new and useful Improvements in Nut-Locks; and I do declare the following to be a full, clear, and exact description of the invention, such as will enable others skilled in the art to which it appertains to make and use the same.

The invention has relation to nut-locks; and the object is to provide means whereby a nut may be securely locked to its bolt and when desired as quickly released from the bolt, so as to permit of its removal therefrom.

With this object in view the invention consists in certain features of construction and combination of parts, which will be hereinafter fully described and claimed.

Figure 1:
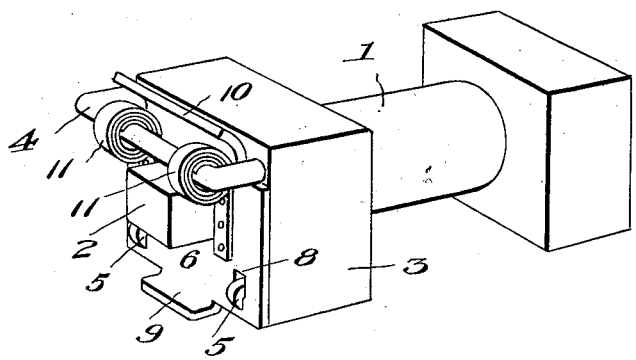
Figure 2:
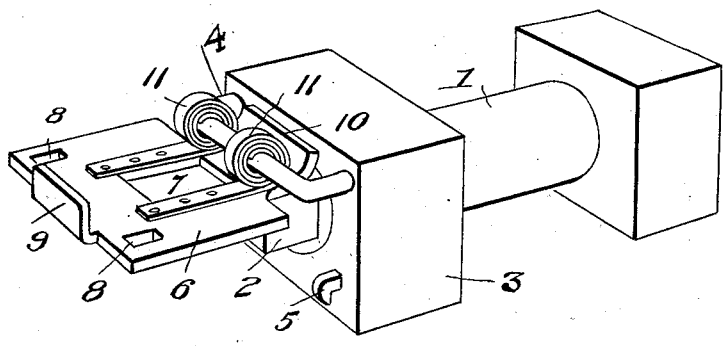

In the accompanying drawings, Figure 1 is a perspective view of my improved nut-lock, showing the nut locked to the bolt; and Fig. 2 is a similar view showing the locking-plate released from the end of the bolt and resting upon the same, in which position the nut may be unscrewed from the bolt.

In said drawings, 1 denotes the bolt, the extreme outer end of which is provided with a square portion 2.

3 denotes the nut, which is adapted to be screwed upon the bolt. This nut has formed or secured to its top a loop 4 and hook-studs 5.

6 denotes a locking-plate which is provided with an aperture 7, corresponding in shape to the end of the bolt, and with holes 8 to receive the hook-studs. One edge of the plate is provided with a lip 9 to facilitate the lifting of the plate from engagement with the bolt and with a lip 10, which is adapted to rest upon the end of the bolt when the plate is removed from locking engagement therewith, as shown in Fig. 2.

11 denotes two coiled springs connected to the loop and to the plate. The energy of these springs is exerted to hold the plate in the position shown in Fig. 1, and when the plate is in this position it is evident that the nut is prevented from turning, and owing to the tension of the springs jar incident to passing trains will not disengage the plate with the hook-lugs.

When it is desired to remove the nut, the plate is swung up into the position shown in Fig. 2, with its lip resting against the end of the bolt. In this position the nut may be unscrewed and removed from the bolt.

Having thus described my invention, what I claim, and desire to secure by Letters Patent, is—

The combination with a bolt provided with a squared end, of a nut having a loop on its top and hook-studs, a plate having a squared aperture and holes to receive the hooks, said plate being connected to the loop by coiled springs, substantially as set forth.

In testimony whereof I have hereunto set my hand in presence of two subscribing witnesses.

PETER CURRAN.

Witnesses:
 JOHN O'BRIEN,
 J. J. BURKE.